Patented Mar. 21, 1950

2,501,556

UNITED STATES PATENT OFFICE 2,501,556

ALKALI METALS AND THEIR HYDRIDES AS CATALYSTS IN AMINE CONDENSATION

Gerald M. Whitman, New Castle, Del., assignor to E. I. du Pont de Nemours & Company, Wilmington, Del., a corporation of Delaware No Drawing. Application December 16, 1949, Serial No. 133,483

15 Claims. (Cl. 260—563)

This invention relates to organic compounds of nitrogen. More particularly, it relates to a new method for preparing amines.

This application is a continuation-in-part of my copending application Serial No. 672,915, filed May 28, 1946, itself a continuation-in-part of my application Serial No. 592,271, filed May 5, 1945, and now abandoned.

One of the theoretically simplest and most economical ways of preparing amines consists in adding ammonia or simple amines to the double bond of olefinic compounds. This reaction proceeds with relative ease when the olefinic double bond is activated by a neighboring group, such as another double bond or a hydroxyl or ester group. Monoolefinic hydrocarbons, however, show considerable inertness toward ammonia and amines and consequently require special conditions for addition to the single ethylenic bond to take place. It has been proposed heretofore to react ammonia and amines with monoolefins at elevated temperature and pressure and in the presence of various catalysts such as amine hydrohalides, rare earth phosphates, reduced ammonium molybdate, etc. These prior methods have in general the disadvantage of giving poor yields and of requiring catalysts which are complex and expensive and/or corrosive to the equipment. Moreover, they are not capable of leading to high molecular weight amines, using low molecular weight amines as starting materials.

This invention has as an object the provision of a new method of preparing amines from ammonia-type compounds, i. e., ammonia, primary, secondary, and tertiary amines, and acyclic hydrocarbons that contain a carbon-to-carbon double bond as the sole unsaturation. A further object is to provide a catalytic method of preparing amines which gives satisfactory yields and uses a cheap non-corrosive catalyst. A still further object is to provide a method of preparing high molecular weight amines from low molecular weight amines. Additional objects will become apparent from an examination of the following description and claims.

These and other objects and advantages are accomplished according to the herein described invention which comprises reacting under substantially anhydrous conditions, in the presence of an elementary alkali metal or an alkali metal hydride as catalyst, at a temperature of at least 100° C., under a pressure of at least 225 atmospheres, a basic ammonia-type compound of the group consisting of ammonia and amines with an acyclic hydrocarbon of 2 to 6 carbon atoms, containing a carbon-to-carbon double bond as the sole unsaturation, and isolating the amine or amines so formed.

The term "ammonia-type compound" is used herein and in the appended claims in its usual and accepted sense to denote ammonia and amines [see, for example, Karrer's Organic Chemistry (English translation, 1938), 20].

One of the reactions involved in the process of this invention is the addition of a compound of the formula

wherein $R_1$ and $R_2$ are hydrogen and/or monovalent organic radicals, or radicals which, together with nitrogen, form a heterocyclic ring, to the double bond of the unsaturated hydrocarbon. With tertiary amines, the reaction mechanism is obscure. It is probable that C-alkylation takes place as well as N-alkylation, and cleavage at the carbon-nitrogen bonds of the original amine and/or of the amines which form is also a possibility, although tertiary amines have heretofore been considered stable in the presence of alkali metals. The complexity of the reaction is shown by the fact that, if one starts with ammonia or a primary amine, the reaction product contains primary, secondary, and tertiary amines; if one starts with a secondary amine, the reaction product contains secondary and tertiary amines; and, if one starts with a tertiary amine, the reaction product again contains secondary and tertiary amines. In every case, there is obtained a greater or lesser amount of high boiling, high molecular weight amines, and usually also a mixture of high boiling, high molecular weight hydrocarbons.

The following examples, in which proportions are in parts by weight unless otherwise specified, are given for illustrative purposes and are not intended to place any restrictions on the herein described invention.

Example 1

A mixture of 73 parts of n-butylamine and 8 parts of metallic sodium was heated with agitation in a stainless steel autoclave under an ethylene pressure of 800–1000 atmospheres at 200° C. for ten hours. During this time a total pressure drop of 835 atmospheres was recorded, the reaction vessel being repressured regularly with ethylene to maintain the pressure above 800 atmospheres. The vessel was cooled, the residual pressure released and the contents of the vessel discharged. Filtration of the product recovered 7.8 parts of metallic sodium. Distillation of the liquid product gave N,N-diethylbutylamine (B. P. 135–137° C.; $n_D^{25}$ 1.4118; neutral equivalent 130.3 compared with the calculated value of 129.3 for $C_8H_{19}N$) corresponding to 48% of the theoretical amount, together with higher-boiling basic materials.

Example II

A mixture of 93 parts of aniline and 8 parts of metallic sodium was heated in an autoclave under 800–1000 atmospheres pressure of ethylene for nine hours at 200° C. During this period the total pressure drop was 190 atmospheres. Distillation of the filtered product yielded N-ethylaniline corresponding to 33% of the theoretical amount of N,N-diethylaniline corresponding to 11% of the theoretical amount, together with some unreacted aniline.

Example III

A mixture of 49 parts of anhydrous ammonia, 5 parts of sodium and 17 parts of n-heptane as a solvent was heated with agitation in a pressure vessel under 800–1000 atmospheres pressure of ethylene at 200° C. for nine hours. Absorption of ethylene occurred throughout this period, during which a total pressure drop of 930 atmospheres occurred, the vessel being repressured as needed to maintain the pressure above 800 atmospheres. The reaction vessel was cooled to −70° C., the residual ethylene expanded to atmospheric pressure through condensers at −70° C. and the cold product discharged from the vessel. Distillation of the product through a vacuum-jacketed column gave ethylamine, diethylamine, and triethylamine in amounts corresponding to 16%, 15%, and 11%, respectively, of the theoretical amounts, together with 29% of the ammonia originally charged.

Example IV

A mixture of 48 parts of ethylenediamine and 5 parts of sodium was heated in an autoclave under 800–1000 atmospheres pressure of ethylene for ten hours at 200° C. A total pressure drop of 600 atmospheres occurred during this period, and the autoclave was repressured as needed to maintain the pressure above 800 atmospheres. Fractional distillation of the product yielded diethylethylenediamine, triethylethylenediamine, and tetraethylethylenediamine, each in about 10–15% of the theoretical amounts.

Example V

A mixture of 51 parts of anhydrous ammonia and six parts of potassium metal was heated in a pressure vessel under 800–1000 atmospheres pressure of ethylene at 200° C. for 8.7 hours, during which time a total pressure drop of 555 atmospheres was recorded, the vessel being repressured as needed. Fractional distillation of the filtered liquid product gave 15.5 parts of diethylamine and 17.3 parts of triethylamine.

Example VI

A stainless steel-lined oscillating autoclave was flushed with nitrogen, charged with 5 parts of sodium, cooled in carbon dioxide-methanol, and evacuated. Fifty-two (52) parts of anhydrous ammonia was added, and the autoclave was pressured with propylene. The reaction was carried out at 250° C. and 850–975 atmospheres total pressure. During 18 hours there was a propylene absorption corresponding to a pressure drop of 375 atmospheres. Distillation of the product gave 41.7 parts of isopropylamine, B. P. 33–34° C., and 7.2 parts of diisopropylamine, B. P. 80–83° C. The corresponding conversions were 23% and 2.3% respectively, and the total yield, based on the ammonia consumed, was of the order of 80%.

When the reaction was carried out at 480–500 atmospheres pressure, but otherwise under identical conditions, there was obtained 13.2 parts of isopropylamine, corresponding to a conversion of 7.5%.

Example VII

The experiment of Example VI was repeated under substantially the same conditions but using, as a diluent, 35 parts of n-heptane. There was obtained 51 parts of isopropylamine, and 7.5 parts of diisopropylamine, representing conversions of 28.9% and 2.5% and yields of 56.8% and 4.9%, respectively.

An identical experiment at 500 atmospheres total pressure gave 24.9 parts of isopropylamine and 2.7 parts of diisopropylamine, representing conversions of 14.1% and 0.9% and yields of 30.5% and 1.9%, respectively.

Example VIII

A stainless steel-lined oscillating autoclave was flushed with nitrogen and charged with 5 parts of sodium and 53 parts of ammonia. Isobutylene under hydraulic pressure was admitted into the autoclave and the reaction was run at 250° C. and 855–950 atmospheres pressure. During 18 hours there was a pressure drop of 155 atmospheres. Distillation of the product gave 19 parts of tert. butylamine, B. P. 43–45° C., corresponding to a conversion of 8.3% and a yield, based on the ammonia consumed, of 55%.

Example IX

In the manner of the preceding examples, a stainless steel-lined oscillating autoclave was flushed with nitrogen and charged with 7.5 parts of sodium hydride, 100 parts of anhydrous ammonia, and 100 parts of ethylene. The vessel was closed and heating and agitation were started. During a reaction time of 14¾ hours at 199–204° C. and 760–960 atmospheres ammonia pressure, there was a total pressure drop of 350 atmospheres. The autoclave was cooled, opened, and its contents discharged. Distillation of the reaction product yielded 86.2 parts of ammonia, 46.6 parts of monoethylamine, 23.3 parts of diethylamine, and 10.2 parts of triethylamine. The total conversion, based on the ethylene charge, was 40.7%. The individual conversions were as follows: ethylamine, 29.0%; diethylamine, 8.9%; triethylamine, 2.8%.

Example X

The reaction vessel of Example IX was charged with 7.5 parts of lithium hydride and 100 parts of anhydrous ammonia and pressured to 500 atmospheres with ethylene. During a reaction time of 13¼ hours at 200–202° C., and 850–1000 atmospheres ammonia pressure, there was a drop in pressure of 730 atmospheres. The reaction product consisted of 89.4 parts of ammonia, 36.3 parts of monoethylamine, 21.3 parts of diethylamine, and 8.4 parts of triethylamine. The total conversion, based on the amount of ammonia originally charged, was 20.1%, and it was distributed as follows: monoethylamine, 13.7%; diethylamine, 5.0%; triethylamine, 1.4%.

Example XI

A mixture of 150 parts of triethylamine and 3 parts of sodium metal was heated at 250° C. and under an ethylene pressure of 250 atmospheres in an agitated copper-lined autoclave for 16 hours. A total pressure drop of 210 atmospheres took place, the vessel being repressured as needed. Fractionation of the product gave 45.7 parts of a liquid boiling above the boiling point (89° C.) of triethylamine, which liquid consisted of a mixture of amines and hydrocarbons.

The products of a number of similar runs (in some of which potassium metal and sodium hydride were used with equally effective results) were combined and fractionated to give 870.9 parts of material boiling above triethylamine. Extraction of this composite with 6 N hydrochloric acid followed by treatment with 40% aqueous potassium hydroxide divided the product into 463.3 parts of acid-soluble material and 348.5 parts of acid-insoluble material.

The acid-soluble portion was fractionated into a number of cuts boiling between 102° C. at atmospheric pressure and 161° C. at 1.5 mm. pressure. Analytical data indicated that this distillate was a mixture of amines containing from eight to at least twenty carbon atoms. For example, the fraction boiling at 134–137° C. at 760 mm. had the composition $C_8H_{19}N$, and infrared spectrographic data indicated that it contained N,N-diethyl-sec. butylamine. It was also unexpectedly found that the product contained secondary, as well as tertiary, amines. For example, the fraction having the composition $C_{16}H_{35}N$ (B. P. 95–97° C. at 0.6 mm. pressure) was found to be a mixture of 46.3% secondary amine and 53.7% tertiary amine.

Fractionation of the acid-insoluble portion gave a number of cuts boiling between 110° C. at atmospheric pressure and 170° C. at 0.125 mm. pressure. Analytical and refractive index data indicated that this distillate was a mixture of saturated aliphatic hydrocarbons, containing a small amount of olefinic hydrocarbons.

Example XII

Tri-n-butylamine (150 parts) reacted with ethylene in the presence of sodium metal (5 parts) at 250° C. and 300 atmospheres ethylene pressure for 16 hours to give 58.5 parts of liquid product boiling above the boiling point of tri-n-butylamine. This product was partially soluble in 6 N hydrochloric acid and the acid-soluble portion was a mixture of amines boiling over a wide range.

Example XIII

A mixture of trimethylamine (150 parts), sodium (5 parts), and decane (50 parts) reacted with ethylene at 275° C. and 500 atmospheres ethylene pressure for 16 hours to give 11.4 parts of a product boiling above trimethylamine. This product contained a mixture of high boiling amines.

Example XIV

Diethylamine (100 parts) reacted with ethylene in the presence of sodium metal (10 parts) at 225° C. and 1000 atmospheres ethylene pressure for 16 hours to give a product containing 31.1 parts of triethylamine and 138.4 parts of higher boiling material.

From several similar runs the triethylamine was separated by distillation and the higher boiling products were combined. This composite was separated into 549 parts of material soluble in 6 N hydrochloric acid and 238 parts of material insoluble in 6 N hydrochloric acid.

Fractionation of the acid soluble material gave the following cuts.

| Cut No. | B. P. | Pressure | Weight |
|---|---|---|---|
|  | ° C. | Mm. | Parts |
| 1 | 80–100 | 760 | 5 |
| 2 | 120° at 760 mm. to 135° at 20 mm. |  | 164 |
| 3 | 75–90 | 1 | 39 |
| 4 | 90–110 | 1 | 243 |
| 5 | 110–130 | 1 | 23.6 |
| 6 | 130–145 | 1 | 11.4 |
| Residue |  |  | 28.7 |

Certain analytical data relative to the higher boiling fractions are indicated below:

| Cut No. | Neutralization Equivalent | N, percent | Amine Distribution | | |
|---|---|---|---|---|---|
|  |  |  | Percent Primary | Percent Secondary | Percent Tertiary |
| 3 | 220.1 | 6.26 | 0 | 62.3 | 37.7 |
|  | 222.5 | 6.23 |  | 61.9 | 38.1 |
| 4 | 240.5 | 6.05 | 0 | 75.5 | 24.5 |
|  | 240.5 | 6.29 |  | 75.0 | 25.0 |
| 5 | 270.1 | 5.95 | 0 | 50 | 50 |
|  | 270.1 | 5.95 |  |  |  |
| 6 | 306.6 | 5.55 | 0 | 26.2 | 74.8 |
|  | 308.6 | 5.45 |  |  |  |
| Residue | 421.9 | 4.57 | 0 | 31.5 | 68.5 |

These data indicate that the above fractions consisted largely of amine in the range between $C_{14}H_{31}N$ (N. E., 213; N% 6.62) and $C_{24}H_{51}N$ (N. E., 353; N%, 3.97).

The weight distribution of the various amine fractions and acid-insoluble material resulting from the reaction of ethylene and diethylamine is given below:

| Amine Fraction | Per Cent of Total Reaction Product | Per Cent of High Boiling Product | Per Cent of 6 N HCl Soluble Product |
|---|---|---|---|
| $(C_2H_5)_3N$ | 17.4 | 0.7 | 0.9 |
| $C_7$–$C_{14}$ | 18.5 | 22.3 | 31.9 |
| $C_{14}$–$C_{18}$ | 31.9 | 38.4 | 54.8 |
| $C_{18}$–$C_{30}$ | 7.2 | 8.6 | 7.4 |
| Acid-insoluble portion | 25.0 | 30.0 |  |

The acid-insoluble material was a mixture of very high boiling hydrocarbons with a small amount of nitrogen-containing products.

Example XV

A mixture of 100 parts of 3,3,5-trimethylhexylamine and 10 parts of sodium was heated with agitation for 16 hours at 200° C. under 500 atmospheres ethylene pressure. Fractionation of the reaction product gave 36.4 parts of N,N-diethyl-3,3,5-trimethylhexylamine (B. P. 104–106° C. at 20 mm. pressure $n_D^{25}$ 1.4311) and 62.9 parts of a higher boiling material which was partly soluble in 6 N hydrochloric acid.

Example XVI

A mixture of 78.7 parts of 2-aminopentane and 5 parts of sodium was heated with agitation for 16 hours at 200° C. under 500 atmospheres ethylene pressure. There was obtained 15.4 parts of N,N-diethyl-2-aminopentane (B. P. 154–158° C. at 760 mm. pressure) and 74.8 parts of a higher boiling product which was partly soluble in 6 N hydrochloric acid.

Example XVII

A mixture of 100 parts of n-butylamine and 10 parts of sodium was heated with agitation for 16 hours at 200° C. under 1000 atmospheres ethylene pressure. There was obtained 68.2 parts of N,N-diethyl-n-butylamine and 82.4 parts of a liquid boiling between 41° C. and 205° C. at 1.5 mm. pressure. This product was 90% soluble in 6 N hydrochloric acid.

*Example XVIII* n-Amylamine (100 parts) and sodium (10 parts) were reacted with ethylene as in Example XVII. There was obtained 55.2 parts of N,N-diethyl-n-amylamine and 73.2 parts of higher boiling amine.

*Example XIX*

Sec.-butylamine (100 parts) and sodium (10 parts) were reacted with ethylene as in Example XVII. There was obtained 31.8 parts of N,N-diethyl-sec.-butylamine and 110.9 parts of higher boiling amines.

While this invention has been illustrated with particular reference to ethylene, propylene and isobutylene, it is to be understood that said invention is generic to acyclic hydrocarbons containing a carbon-to-carbon double bond as the sole unsaturation and having from 2 to 6 carbon atoms. Terminally unsaturated acyclic monoolefinic hydrocarbons, i. e., those in which the double bond is between the carbon atoms in the 1,2 positions react most readily and are, therefore, preferred in my process. Other examples of suitable unsaturated hydrocarbons are pentene-1, butene-1, hexene-1 and the like. Of these, ethylene is by far the most useful.

While this invention has been illustrated with particular reference to ammonia and certain specific amines, it is to be understood that said invention is generic to all basic ammonia-type compounds of the group consisting of ammonia, amines having hydrogen attached to amino nitrogen, that is primary and secondary amines and amines having no hydrogen attached to amino nitrogen, that is tertiary amines. Included among examples of said basic ammonia-type compounds in addition to those already listed are: methylamine, ethylamine, dimethylamine, octylamine, cyclohexylamine, dicyclohexylamine, dodecylamine, ocetadecylamine, pyrrolidine, piperidine, benzylamine, hexamethylenediamine, tripropylamine, tri-n-hexylamine, and the like. Mixtures of two or more monoolefins and/or two or more ammonia-type compounds may be used. However, I prefer to employ ammonia and primary or secondary hydrocarbon amines, particularly alkylamines, since they give a higher ratio of amines to hydrocarbons than do tertiary amines. Further, I prefer to employ amines free of aliphatic unsaturation. Unsaturated amines such as allylamine and methallylamine do react with unsaturated hydrocarbons such as ethylene in the presence of alkali metals, but in such cases the reaction is complicated by self-condensation of the unsaturated amines and it is less clear-cut. If the process is to be used in the preparation of high molecular weight amines, it is cheaper to start with primary or secondary alkylamines of one to eighteen carbon atoms of which those having not more than eight carbon atoms are especially preferred. However, tertiary amines of up to eighteen or more carbon atoms can be used, of which hydrocarbon tertiary amines free from aliphatic unsaturation, such as tertiary alkylamines, are preferable.

The catalyst may be any member of the group consisting of alkali metal hydrides and elementary alkali metals. Included among examples of members of this group are: elementary potassium, elementary lithium, sodium hydride, lithium hydride, and potassium hydride. Elementary sodium is preferred on account of the fact that it is the cheapest and most readily available member of this group.

The reactants can be used in any desired relative proportions. It is often advantageous to use an excess of the cheaper reactant (e. g., ammonia or ethylene) to force the reaction nearer completion. The amount of catalyst is not particularly critical. It is in general used in proportions of 0.03–0.4 gram atom (calculated on the basis of the alkali metal content thereof) per mol of ammonia-type compound, although as little as 0.01 or as much as one or even five gram atoms per mol may be used. Obviously, the smallest quantity consistent with efficient operation should be used.

An inert solvent or diluent may be used if desired, preferably an inert hydrocarbon, i. e., a hydrocarbon free from non-benzenoid unsaturation (i. e., a hydrocarbon of the group consisting of aromatic and saturated acyclic and alicyclic hydrocarbons), such as kerosene, cyclohexane, benzene, and the like.

A critical factor in the process of this invention is the pressure. Experience has shown that a pressure of at least 225 atmospheres is essential if practical yields are to be obtained. Preferably, on account of the superior yields had therewith, the pressure should exceed 500 atmospheres and it can be as high as the equipment will withstand. Optimum results are had at pressures not lower than 800 atmospheres, a desirable pressure range being 800–1200 atmospheres. In general the autogenous pressure developed by the reactants at reaction temperature is insufficient, and it is, therefore, necessary to apply extraneous pressure. This can be done by compression of a reactive gas like ethylene or propylene when this gas is itself the reactant. Liquid reactants can be compressed hydrostatically, for example, by placing them in a flexible metal container which is subjected to oil pressure. Alternatively, the liquid reactant can be compressed directly by an appropriate non-miscible fluid which is in turn compressed by a pump, the reactant being forced through a purification chamber into the reactor. The reactant compressed in this manner can be either the unsaturated hydrocarbon or the ammonia-type compound.

The reaction temperature is also a critical factor. A temperature of at least 100° C. is essential to the obtainment of practical yields. The reaction is impracticably slow below 100° C., even at high pressures. Preferably, in order to obtain maximum yields, the temperature should be higher than 150° C. It can be as high as the reactants will stand without decomposition, the preferred range being 170° C.–300° C. since optimum results are had at temperatures within said range.

The reaction time depends upon the choice of reactants, the temperature, and the pressure. In general, at a temperature of 175° C.–200° C. and a pressure of 800–1000 atmospheres, satisfactory yields are obtained within 5–10 hours.

As could be expected, not all unsaturated hydrocarbons react at the same rate in the process of this invention. Ethylene is most effective; it reacts with ammonia and amines in appreciable amounts at the lowest range of pressure and temperature disclosed. The higher olefins, e. g., propylene and isobutylene may, and in general do, require more drastic conditions, particularly higher pressures. The same is true of amines, as some of them are more reactive than others. It is, however, a matter of simple experimentation to determine with any given unsaturated hydrocarbon or amine the conditions which favor a relatively high rate of reaction. In this connection, it may be pointed out that a set of conditions which gives what appears to be a relatively low conversion to amines may be entirely practical and even sometimes desirable, since it is feasible in industrial practice to recycle the unused reactants over the catalyst and thus achieve high conversions in several passes.

My new method for preparing amines possesses advantages not previously combined in any single process. For example, my novel process readily provides amines in excellent yields. Furthermore, the catalyst employed in said process is readily obtained, is relatively inexpensive and is substantially inert toward the equipment in which the said process is effected.

A particular and entirely unexpected advantage of the process is that it makes possible the production of high molecular weight amines from simple, low molecular weight amines such as diethylamine and cheap unsaturates such as ethylene. As has been shown, mixtures of amines having up to 24 carbon atoms and even more can thus be obtained conveniently and economically. High molecular weight amines, e. g., those in the 10 to 20 carbon atom range, find uses in such varied fields as rodent repellents, corrosion inhibitors, flotation agents for iron ore, textile chemical intermediates, surface-active agents, etc.

As many apparently widely different embodiments of this invention may be made without departing from the spirit and scope thereof, it is to be understood that this invention is not limited to the specific embodiments thereof except as defined in the appended claims.

I claim:

1. In a process for obtaining an amine, the step of heating a basic ammonia-type compound of the group consisting of ammonia and amines with an acyclic hydrocarbon containing not more than six carbon atoms and, as the sole unsaturation, a double bond between the carbon atoms in the 1,2-positions, said heating being effected under substantially anhydrous conditions at a temperature of at least 100° C. under a pressure of at least 225 atmospheres in the presence, as catalyst, of a member of the group consisting of alkali metal hydrides and elementary alkali metals.

2. In a process for obtaining an amine as set forth in claim 1, said heating being effected as therein set forth and in the presence of a hydrocarbon free from non-benzenoid unsaturation as solvent.

3. In a process for obtaining an amine, the step of heating ammonia with an acyclic hydrocarbon containing not more than six carbon atoms and, as the sole unsaturation, a double bond between the carbon atoms in the 1,2-positions, said heating being effected under substantially anhydrous conditions at a temperature of at least 100° C. under a pressure of at least 225 atmospheres in the presence, as catalyst, of a member of the group consisting of alkali metal hydrides and elementary alkali metals.

4. In a process for obtaining an amine, the step of heating an amine having hydrogen attached to amino nitrogen with an acyclic hydrocarbon containing not more than six carbon atoms and, as the sole unsaturation, a double bond between the carbon atoms in the 1,2-positions, said heating being effected under substantially anhydrous conditions at a temperature of at least 100° C. under a pressure of at least 225 atmospheres in the presence, as catalyst, of a member of the group consisting of alkali metal hydrides and elementary alkali metals.

5. In a process for obtaining an amine, the step of heating a tertiary amine with an acyclic hydrocarbon containing not more than six carbon atoms and, as the sole unsaturation, a double bond between the carbon atoms in the 1,2-positions, said heating being effected under substantially anhydrous conditions at a temperature of at least 100° C. under a pressure of at least 225 atmospheres in the presence, as catalyst, of a member of the group consisting of alkali metal hydrides and elementary alkali metals.

6. In a process for obtaining an amine, the step of heating a basic ammonia-type compound of the group consisting of ammonia and amines with an acyclic hydrocarbon containing not more than six carbon atoms and, as the sole unsaturation, a double bond between the carbon atoms in the 1,2-positions, said heating being effected under substantially anhydrous conditions at a temperature of at least 150° C. under a pressure of at least 500 atmospheres in the presence, as catalyst, of a member of the group consisting of alkali metal hydrides and elementary alkali metals.

7. In a process for obtaining an amine as set forth in claim 6, said heating being effected as therein set forth and in the presence of a hydrocarbon free from non-benzenoid unsaturation as solvent.

8. In a process for obtaining an amine, the step of heating an alkylamine having hydrogen attached to amino nitrogen with an acyclic hydrocarbon containing not more than six carbon atoms and, as the sole unsaturation, a double bond between the carbon atoms in the 1,2-positions, said heating being effected under substantially anhydrous conditions at a temperature of at least 150° C. under a pressure of at least 500 atmospheres in the presence, as catalyst, of a member of the group consisting of alkali metal hydrides and elementary alkali metals.

9. In a process for obtaining an amine, the step of heating a tertiary alkylamine with an acyclic hydrocarbon containing not more than six carbon atoms and, as the sole unsaturation a double bond between the carbon atoms in the 1,2-positions, said heating being effected under substantially anhydrous conditions at a temperature of at least 150° C. under a pressure of at least 500 atmospheres in the presence, as catalyst, of a member of the group consisting of alkali metal hydrides and elementary alkali metals.

10. In a process for obtaining an amine, the step of heating a basic ammonia-type compound of the group consisting of ammonia and amines with ethylene, said heating being effected under substantially anhydrous conditions at a temperature within the range of from 175° to 300° C. under a pressure of at least 800 atmospheres in the presence, as catalyst, of a member of the group consisting of alkali metal hydrides and elementary alkali metals.

11. A process for obtaining an amine as set forth in claim 10 wherein said catalyst is an alkali metal hydride.

12. A process for obtaining an amine as set forth in claim 10 wherein said catalyst is an elementary alkali metal.

13. In a process for obtaining an amine as set forth in claim 10, said heating being effected as therein set forth and in the presence of a hydrocarbon free from non-benzenoid unsaturation as solvent.

14. In a process for obtaining an amine, the step of heating ammonia with ethylene, said heating being effected under substantially anhydrous conditions at a temperature within the range of from 175° C. to 300° C. under a pressure within the range of from 800 to 1200 atmospheres in the presence of elementary sodium as catalyst.

15. In a process for obtaining an amine as set forth in claim 14, said heating being effected as therein set forth and in the presence of a hydrocarbon free from non-benzenoid unsaturation as solvent.

GERALD M. WHITMAN.

No references cited.